3,481,748
PREPARATION OF A FLAVORING FROM SEA TANGLE

Rinjiro Saruno, Saga-shi, and Kengo Ishida, Tokyo, Japan, assignors to Kyowa Hakka Kogyo Co., Ltd., Chiyoda-ku, Tokyo, Japan, a corporation of Japan
No Drawing. Filed Jan. 18, 1966, Ser. No. 521,444
Claims priority, application Japan, Jan. 19, 1965, 40/2,348; Jan. 20, 1965, 40/2,534
Int. Cl. A23l 1/22, 1/26
U.S. Cl. 99—140                 4 Claims

ABSTRACT OF THE DISCLOSURE

A flavoring prepared by the chemical solubilization of seaweed such as sea tangle. The resultant flavoring may be added to conventional seasons, such as monosodium glutamate, to form a composite flavoring.

---

This invention relates to a flavoring. More particularly, it relates to a process and a flavoring made thereby from seaweed. Even more particularly, the invention relates to a process and the flavoring produced thereby from seaweed such as tea tangle which may be employed alone or together with known chemical flavorings.

Recently, materials related to nucleic acids such as sodium inosinate, sodium guanylate, etc. and salts of amino acids or organic acids such as sodium succinate, sodium aspartate, etc. have been used together with sodium glutamate to produce composite chemical flavorings having a much improved tasting quality because of the synergism between said organic substances and the sodium glutamate. However, in comparison with natural flavorings such as the broth of sea tangle, these prior art composite chemical flavorings are deficient not only in fragrance but also in smoothness and richness of taste.

When the flavorings now on the market, such as the various mixtures of sodium glutamate, sodium inosinate, sodium guanylate, etc., are added to a 1% common salt solution, they have less fragrance and taste than natural solution, they have less fragrance and taste than natural flavorings such as the broth of sea tangle. This results because such flavorings are deficient in high molecular weight components such as mannans, algin, hemicellulose, etc. Thus, it is considered preferable to add such high molecular weight components to a chemical flavoring. However, the high molecular weight components tend to be broken down or decomposed by the known methods wherein enzymes such as cellulose are employed in solubilization. Yet no enzymes having a greater solubilizing power have been found up to now. Furthermore, when sea tangle is solubilized with the use of enzymes, the sulfur-containing compounds contained therein are decomposed, thereby producing an unpleasant odor.

One of the objects of the present invention is to provide an improved process for the production of a flavoring from seaweed which overcomes the disadvantages and deficiencies of the prior art methods.

Another object of the present invention is to provide a flavoring which has excellent fragrance as well as a good smoothness and richness of taste, like natural sea tangle.

A further object of the invention is to provide a process for producing a flavoring having good quality and fragrance which may be carried out economically on an industrial scale.

A still further object of the invention is to provide a flavoring made from seaweed having a refined good taste and a process for producing the same.

These and other objects and advantages of the present invention will become apparent to those skilled in the art from a consideration of the following specification and claims.

In accordance with the present invention, it has been found that an excellent flavoring having the above-mentioned advantages may be obtained if the seaweed is chemically solubilized while maintaining the high molecular weight state thereof. The methods to be employed therefor in accordance with the present invention include: (1) hydroxyalkylation, (2) alkali treatment, (3) acetylation, (4) methyl-etherization. All of these methods affect the polysaccharides in the seaweed.

In the first method mentioned above, i.e., hydroxyalkylation, the seaweed is cut into pieces and suspended in water. It is made alkaline by the addition of, for example, sodium hydroxide thereto. Then, an alkylene oxide such as ethylene oxide or propylene oxide is added to the alkaline solution of seaweed. Sea tangle may be employed efficaciously in this method. The dispersion of finely cut seaweed is reacted with, for example, ethylene oxide at a low temperature, such as 30° to 50° C., for 24–48 hours in a closed vessel in order to hydroxyethylate and solubilize the mannans, algin, hemicullulose, etc. in the seaweed. The thus treated liquid, which is in a colloidal state, is then neutralized with, for example, hydrochloric acid and then concentrated and dried to produce a flavoring. The dried product may be powdered, if desired. The resultant flavoring may be mixed with other chemical flavorings or with natural flavorings to produce a composite flavoring. With this method, the insoluble high molecular weight components in the seaweed are solubilized while, simultaneously, the mercapto compounds are hydroxyalkylated to improve and stabilize the fragrance of the product.

In another embodiment of the hydroxyalkylation method described above, a small amount of the obtained colloidal liquid may be mixed with a conventional crystalline or powdery composite or simple flavoring. Thereafter, the mixture is dried to produce a coating on the surface of said flavoring. In this embodiment, the colloidal liquid acts as a caking agent for the mixture of various flavorings, while simultaneously improving the fragrance and taste thereof. Thus, in this manner, the mixed flavorings stay mixed and do not become reseparated. The concentration of the colloidal liquid is preferably about 2–6% by weight when employed in this manner. The liquid at this concentration is viscous and readily adheres to the surface of various flavorings. Furthermore, since the hygroscopicity thereof is low even after being dried, the resultant composite flavoring does not become agglomerated.

The second method mentioned hereinabove for treating the seaweed in accordance with the present invention, alkali treatment, involves grinding seaweed such as sea tangle in water until a colloidal dispersion thereof is obtained, adding an alkali such as sodium hydroxide thereto to give a pH of 9–10 and keeping the resultant solution at a temperature of about 30° C. for 24 hours. The solution is then neutralized, dried and powdered, the latter if desired.

Aceylation, the third method mentioned hereinabove, comprises grinding a mixture of seaweeds with sodium hydroxide at a pH of about 8, adding acetic acid thereto while keeping the pH at about 8 (in order to acetylate), neutralizing the resultant solution to obtain a pH of about 6, drying by condensation and washing with alcohol.

Methyl-etherization, the fourth method mentioned hereinabove, involves adding methyl iodide, liquid ammonia and metallic sodium to the seaweed to produce the o-methyl compounds of the polysaccharides therein. In this manner, the seaweed is chemically solubilized.

The products obtained by each of the four methods described herein are substantially equivalent with respect to the improved taste obtained therefrom, particularly when used with monosodium glutamate wherein a synergistic effect is noted. This is the case even though the products obtained by these four methods do not appear to be precisely the same chemically. However, it is clear that the products obtained are substantially different from those obtained when sea tangle, for example, is digested with an enzyme such as cellulose. As pointed out hereinabove, the present invention gives a flavoring having improved advantageous properties compared to those prepared by enzymatic solubilization.

The following examples are given merely as illustrative of the present invention and are not to be considered as limiting.

EXAMPLE 1

Six grams of sea tangle is finely cut. One gram of sodium hydroxide and 30 ml. of water are added thereto, and the mixture kept at 35° C. for one hour. Thereafter, three grams of ethylene oxide is added to the mixture, and the resultant mixture is maintained at 40° C. for 25 hours. The thusly treated liquid, which is in a colloidal state, is neutralized with hydrochloric acid to a pH of 4.5. This colloidal liquid is concentrated and powdered and mixed well with 1 gram of sodium inosinate and 10 grams of monosodium glutamate to obtain a flavoring. The resultant flavoring possesses the advantageous properties noted above.

EXAMPLE 2

Six grams of tea tangle is finely cut. One gram of sodium hydroxide and 30 ml. of water are added thereto, and the mixture left at 35° C. for one hour. Four grams of propylene oxide is added thereto, and the resulting mixture maintained at 40° C. for 48 hours. After this time, the mixture is neutralized and dried to produce a flavoring. This flavoring may be mixed with other conventional flavorings to produce a composite flavoring, as in Example 1.

EXAMPLE 3

Water is added to 10 grams of sea tangle. This is sufficiently ground by a mixer to a colloidal state. The pH of the resultant colloidal liquid is adjusted to 10 with sodium hydroxide, and the liquid is then maintained at 30° C. for 24 hours. The thusly treated liquid is neutralized and dried and then mixed with sodium glutamate. It may also be mixed with other conventional flavorings. The final dried mixture is then ground to produce a powdered flavoring.

EXAMPLE 4

Thirty ml. of water is added to 10 grams of sea tangle. The pH thereof is adjusted to 8.0 with sodium hydroxide. The mixture is ground, and 1.2 grams of acetic acid is added to the ground mixture while keeping the pH value thereof at 8.0 with alkali so that the mixture may be acetylated sufficiently. The pH of the acetylated product is adjusted to 6.0 with hydrochloric acid. The product is concentrated and dried and washed with alcohol. Thereafter, the product may be mixed with other flavorings, as mentioned in the preceding examples, to produce a flavoring.

EXAMPLE 5

Ninety grams of sodium chloride (about 50 mesh) is mixed well with 10 grams of finely powdered sodium glutamate. Then, 10 ml. of a colloidal liquid (2%) produced by solubilizing sea tangle by treatment with ethylene oxide, as described above, is added to the mixture of sodium chloride and sodium glutamate. After stirring well, the mixture is dried with hot air to produce a flavoring. This flavoring has a diminished salty taste and has a taste like the sea tangle itself.

EXAMPLE 6

Ninety grams of sodium glutamate is mixed well with 10 grams of sodium inosinate. To this mixture is added 30 ml. of a colloidal liquid (2.5%) which is obtained by solubilizing sea tangle by treatment with ethylene oxide, as described in, for example, Example 1 above. After mixing well, the resultant mixture is dried with hot air to produce 100 grams of a flavoring having excellent characteristics.

As can be seen from the above, the flavoring or seasoning produced by the present invention may take the form of a blended seasoning comprising a conventional chemical flavoring such as monosodium glutamate coated with the colloidal solubilized solution of seaweed or a mere mixture of a conventional flavoring agent such as monosodium glutamate with a dried powder of the colloidal solubilized solution of seaweed.

What we claim is:

1. A process for producing a flavoring which comprises forming an alkaline colloidal suspension of sea tangle in water, adding ethylene oxide or propylene oxide to said alkaline suspension, allowing the resultant mixture to react at a temperature of about 30° to 50° C. for at least about 24 to 48 hours, and the neutralizing and drying of said suspension.

2. The process of claim 1, further comprising the step of adding the colloidal suspension obtained after the reaction with ethylene oxide or propylene oxide to a chemical flavoring, and then drying to obtain a composite flavoring.

3. A process for producing a flavoring which comprises forming a colloidal suspension of sea tangle in water, adding an alkali thereto to give a pH of about 9 to 10, allowing the resultant suspension to stand at a temperature of about 30° C. for at least about 24 hours, and then neutralizing and drying said suspension.

4. A process for producing a flavoring which comprises the steps of forming a colloidal suspension of sea tangle in water, adding sodium hydroxide to give a pH of about 8, adding acetic acid thereto while keeping the pH at about 8, and neutralizing the resultant solution to obtain a pH of about 6, said steps being carried out at ambient temperature, and then drying the suspension.

References Cited

UNITED STATES PATENTS

| | | | |
|---|---|---|---|
| 93,477 | 8/1869 | Rand | 99—131 |
| 1,513,298 | 10/1924 | Turrentine | 260—209.6 XR |
| 1,680,865 | 8/1928 | Fujii | 99—16 |
| 2,811,451 | 10/1957 | Tjoa | 99—131 |
| 3,012,892 | 12/1961 | Marcus | 99—131 |
| 3,197,459 | 7/1965 | Bonniksen | 260—209.6 |

OTHER REFERENCES

Kasahara, Chemical Abstracts, volume 44, column 8018, 1950.

RAYMOND N. JONES, Primary Examiner

J. R. HOFFMAN, Assistant Examiner